US011075886B2

(12) United States Patent
Paul et al.

(10) Patent No.: US 11,075,886 B2
(45) Date of Patent: Jul. 27, 2021

(54) IN-SESSION SPLITTING OF NETWORK TRAFFIC SESSIONS FOR SERVER TRAFFIC MONITORING

(71) Applicant: Keysight Technologies Singapore (Sales) Pte. Ltd., MPLS, MN (US)

(72) Inventors: Santanu Paul, Austin, TX (US); Kristopher Raney, Austin, TX (US); Dennis J. Cox, Austin, TX (US)

(73) Assignee: KEYSIGHT TECHNOLOGIES SINGAPORE (SALES) PTE. LTD., Singapore (SG)

( * ) Notice: Subject to any disclaimer, the term of this patent is extended or adjusted under 35 U.S.C. 154(b) by 293 days.

(21) Appl. No.: 15/380,143

(22) Filed: Dec. 15, 2016

(65) Prior Publication Data
US 2018/0176189 A1 Jun. 21, 2018

(51) Int. Cl.
*H04L 29/06* (2006.01)
*H04L 12/26* (2006.01)
*H04L 29/08* (2006.01)
*H04L 12/24* (2006.01)

(52) U.S. Cl.
CPC ........ *H04L 63/0428* (2013.01); *H04L 43/026* (2013.01); *H04L 63/0263* (2013.01); *H04L 63/0471* (2013.01); *H04L 63/061* (2013.01); *H04L 67/14* (2013.01);
(Continued)

(58) Field of Classification Search
CPC ............... H04L 63/0428; H04L 63/061; H04L 63/1405; H04L 67/14; H04L 67/2814
See application file for complete search history.

(56) References Cited

U.S. PATENT DOCUMENTS 5,935,212 A * 8/1999 Kalajan ............... H04L 63/0428
709/203
6,473,407 B1 * 10/2002 Ditmer ................ G06F 11/0709
370/252
(Continued)

OTHER PUBLICATIONS

Notice of Allowance dated Oct. 9, 2019; Raney, "Active Firewall Control for Network Traffic Sessions Within Virtual Processing Platforms", Filed Dec. 15, 2016, U.S. Appl. No. 15/380,061, 14 pgs.
(Continued)

*Primary Examiner* — Saleh Najjar
*Assistant Examiner* — Devin E Almeida

(57) ABSTRACT

Methods and systems are disclosed that provide in-session splitting of network traffic sessions for monitoring of traffic between network clients and network servers. This in-session splitting is based upon monitoring traffic sessions for one or more events and then initiating a proxied session based upon detection of the one or more events. For further embodiments, the creation of the proxied session is implemented based upon detection of a request for a secure link within the session traffic, and the proxied session is then implemented such that original session participants are not aware of the proxied session. The encrypted secure communications between the network client and the network server are split into two connections that decrypted and re-encrypted so that the contents of the secure link can be analyzed to identify network threats and/or other desired network related activities.

24 Claims, 9 Drawing Sheets

(52) U.S. Cl.
CPC ........ *H04L 67/2814* (2013.01); *H04L 41/046* (2013.01); *H04L 43/04* (2013.01)

(56) References Cited

U.S. PATENT DOCUMENTS

| | | | | |
|---|---|---|---|---|
| 7,249,377 | B1* | 7/2007 | Lita | G06F 21/6236 |
| | | | | 380/255 |
| 7,506,368 | B1* | 3/2009 | Kersey | H04L 9/321 |
| | | | | 726/12 |
| 7,681,226 | B2 | 3/2010 | Kraemer et al. | |
| 7,849,166 | B1* | 12/2010 | Chang | H04L 63/0428 |
| | | | | 709/220 |
| 8,176,553 | B1* | 5/2012 | Magdych | H04L 63/1433 |
| | | | | 726/23 |
| 8,190,875 | B2* | 5/2012 | Lev Ran | H04L 63/0428 |
| | | | | 713/150 |
| 8,543,726 | B1* | 9/2013 | Kann | H04L 63/0281 |
| | | | | 709/219 |
| 8,914,629 | B2* | 12/2014 | Rubin | H04L 63/0823 |
| | | | | 713/157 |
| 9,066,321 | B1 | 6/2015 | Kikta et al. | |
| 9,110,703 | B2 | 8/2015 | Santos et al. | |
| 9,680,728 | B2 | 6/2017 | Besser | |
| 10,091,170 | B2* | 10/2018 | Shankar | H04L 63/029 |
| 10,171,425 | B2 | 1/2019 | Raney et al. | |
| 10,616,361 | B2* | 4/2020 | Gerdfeldter | H04L 67/2814 |
| 2004/0255161 | A1* | 12/2004 | Cavanaugh | H04L 63/1408 |
| | | | | 726/23 |
| 2005/0201370 | A1* | 9/2005 | Poyhonen | H04L 29/12537 |
| | | | | 370/389 |
| 2006/0174319 | A1 | 8/2006 | Kraemer et al. | |
| 2007/0281662 | A1* | 12/2007 | Kim | H04W 4/029 |
| | | | | 455/404.2 |
| 2009/0083538 | A1* | 3/2009 | Merugu | H04L 9/0827 |
| | | | | 713/153 |
| 2009/0150883 | A1 | 6/2009 | Tripathi et al. | |
| 2010/0125855 | A1 | 5/2010 | Ferwerda et al. | |
| 2010/0274848 | A1* | 10/2010 | Altmaier | H04L 67/104 |
| | | | | 709/203 |
| 2010/0333165 | A1 | 12/2010 | Basak et al. | |
| 2011/0004698 | A1 | 1/2011 | Wu | |
| 2011/0225647 | A1 | 9/2011 | Dilley et al. | |
| 2012/0174196 | A1* | 7/2012 | Bhogavilli | H04L 63/1458 |
| | | | | 726/5 |
| 2012/0185913 | A1 | 7/2012 | Martinez et al. | |
| 2012/0265976 | A1 | 10/2012 | Spiers et al. | |
| 2013/0031233 | A1 | 1/2013 | Feng et al. | |
| 2013/0291109 | A1 | 10/2013 | Staniford et al. | |
| 2013/0346472 | A1* | 12/2013 | Wheeldon | H04L 67/2814 |
| | | | | 709/203 |
| 2014/0229605 | A1 | 8/2014 | Besser | |
| 2014/0245423 | A1 | 8/2014 | Lee | |
| 2015/0082428 | A1 | 3/2015 | Dokey et al. | |
| 2015/0263889 | A1 | 9/2015 | Newton | |
| 2015/0264014 | A1 | 9/2015 | Budhani et al. | |
| 2015/0319030 | A1 | 11/2015 | Nachum | |
| 2015/0341318 | A1 | 11/2015 | Lee | |
| 2015/0381412 | A1 | 12/2015 | Anantharam et al. | |
| 2016/0014158 | A1 | 1/2016 | Schrecker et al. | |
| 2016/0094418 | A1 | 3/2016 | Raney | |
| 2016/0110211 | A1 | 4/2016 | Karnes | |
| 2016/0183085 | A1* | 6/2016 | Yerrabommanahalli | |
| | | | | H04W 12/04 |
| | | | | 713/153 |
| 2016/0210131 | A1* | 7/2016 | Vangelov | G06F 8/65 |
| 2016/0378987 | A1 | 12/2016 | Ferrara et al. | |
| 2017/0099195 | A1 | 4/2017 | Raney | |
| 2017/0118102 | A1 | 4/2017 | Majumder et al. | |
| 2017/0163510 | A1 | 6/2017 | Arora et al. | |
| 2017/0264592 | A1* | 9/2017 | Yoda | H04L 45/745 |
| 2017/0310670 | A1* | 10/2017 | Bronshtein | H04L 63/0823 |
| 2018/0176189 | A1 | 6/2018 | Paul et al. | |

OTHER PUBLICATIONS

Ixia, Ixia xFilter, Data Sheet, 5 pgs. (May 2015).
Ixia, Ixia Phantom vTap With TapFlow Filtering, Data Sheet, 4 pgs. (Jul. 2015).
Ixia, Ixia Flex Tap, Data Sheet, 5 pgs. (Oct. 2015).
Hofstede et al., "Flow Monitoring Explained: From Packet Capture to Data Analysis With NetFlow and IPFIX", IEEE, 31 pgs. (May 2014).

* cited by examiner

IN-SESSION SPLITTING OF NETWORK TRAFFIC SESSIONS FOR SERVER TRAFFIC MONITORING

TECHNICAL FIELD

This technical field relates to monitoring packet flows for network communications and, more particularly, to monitoring such packet flows within network server sessions.

BACKGROUND

Packet-based data networks continue to grow in importance, and it is often desirable to monitor network traffic associated with these packet-based networks on an ongoing basis. To meet these monitoring needs, copies of network packets can be forwarded to diagnostic network monitoring tools. Packets are often forwarded using network hubs, test access ports (TAPs), and/or switched port analyzer (SPAN) ports available on network switch systems.

To help alleviate the problem of limited access to network packets for monitoring, tool aggregation devices or packet broker devices have also been developed that allow shared access to the monitored network packets. In part, these network packet broker devices allow users to obtain packets from one or more network monitoring points (e.g., network hubs, TAPs, SPAN ports, etc.) and to forward them to different monitoring tools. Network packet brokers can be implemented as one or more packet processing systems in hardware and/or software that provide access and visibility to multiple monitoring tools. These network packet brokers can also aggregate monitored traffic from multiple source links and can load balance traffic of interest to various tools. The traffic of interest can be network packets that are selected by the packet brokers through packet filters and related packet forwarding rules that identify particular packets or packet flows from within the monitored network traffic as traffic of interest.

Network packet analysis tools include a wide variety of devices that analyze packet traffic, including traffic monitoring devices, packet sniffers, data recorders, voice-over-IP monitors, intrusion detection systems, network security systems, application monitors, and/or other network tool devices or systems. Network analysis tools, such as traffic analyzers, are used within packet-based data networks to determine details about the network packet traffic flows within the packet communication network infrastructure.

Certain network communication systems also include virtual processing environments that include virtual machine (VM) platforms hosted by one or more VM host servers. For example, network applications and resources can be made available to network-connected systems as virtualized resources operating within virtualization layers on VM host servers. In some embodiments, processors or other programmable integrated circuits associated with a server processing platform (e.g., server blade) and/or combinations of such server processing platforms operate to provide virtual machine platforms within the server processing platforms. A virtual machine (VM) platform is an emulation of a processing system or network application that is formed and operated within virtualization layer software being executed on a VM host hardware system. By operating multiple VM platforms and/or application instances within such a virtualization layer also operating on VM host hardware system, a variety of processing resources can be provided internally to the virtual processing environment and/or externally to other network-connected processing systems and devices.

When a network to be monitored includes virtual processing environments, however, difficulties arise in identifying and controlling risky packet traffic for network communications with VM platforms operating within such virtual processing environments to provide various application resources. For example, web based computing services (e.g., Amazon web services) allow a wide variety of external network-connected users to obtain dedicated and elastic processing resources within virtual processing environments running on a large number of interconnected servers. These external users can install, initialize, and operate a wide variety of user applications as instances within VM platforms operating within the virtual processing environment. Further, the external users can be corporate or commercial entities that provide multiple different application services to employees and/or end-user consumers of the processing resources. Identifying and controlling risking packet traffic is difficult within such virtual processing environments.

For some solutions, a network firewall application is used within a processing system to ask a user whether a network service should be allowed network access when it starts running within the processing system. If the user selects not to allow network access, the network service is isolated from packet communications with the network. Similarly, this network firewall application can also ask the user whether a particular network source should be allowed to access to the network service operating within the processing system. If the user selects not to allow access from the network source, incoming packets directed to the network service are dropped. However, this micro-segmentation of access, where access to network services is blocked except for specifically allowed network sources, can create problems in the case of misconfigurations. For example, when a legitimate user-side network source attempts to use a network service and is unable to connect, the network source cannot determine whether the service is down, the network is down, or access is being blocked by security rules. It can be a very difficult to debug and correct this situation where access is being denied due to misconfigured application of security rules because packets are being dropped as part of the firewall's blocking of access.

Certain network monitoring environments include monitoring of traffic sessions formed between network client and a network server are being monitored. For prior proxy monitoring solutions in these environments, proxies are non-transparent and terminate the current connection before initiating a new connection. This termination and re-initiation makes it obvious to a network source that the communication session has changed and a proxy has been initiated. In addition with prior solutions, once a proxy has been initiated, it is difficult to seamlessly handoff the connection to the original participants and terminate the proxy if it is later determined that the proxy is not needed.

SUMMARY

Methods and systems are disclosed that provide in-session splitting of network traffic sessions for monitoring of traffic between network clients and network servers. This in-session splitting is based upon monitoring the traffic sessions for one or more events and then initiating a proxied session based upon detection of the one or more events. For further embodiments, the creation of the proxied session is implemented based upon detection of a request for a secure link with the session traffic, and the proxied session is be implemented such that original session participants are not aware of the proxied session. The encrypted secure communications between the network client and the network server are split into two connections with one including the network client and one including the network server. Each connection is then decrypted and re-encrypted from so that the contents of the secure link can be analyzed to identify network threats and/or other desired network related activities. Other features and variations can be implemented, if desired, and related systems and methods can be utilized, as well.

For one embodiment, the method is disclosed to monitor server network traffic including monitoring packet traffic for a network server, allowing a traffic session to be formed between the network client and the network server based upon a connection request from the network client, monitoring the traffic session to detect one or more events, and based upon detecting the one or more events initiating a proxied session between the network client and the network server. For further embodiments, the network server provides one or more network services to the network client.

For additional embodiments, the initiating includes splitting the traffic session into a first connection including the network client and a second connection including the network server. For further embodiments, the method includes analyzing contents of packets within the proxied session to identify one or more network threats. For still further embodiments, the method includes taking one or more actions with respect to the network server based upon identification of the one or more network threats.

For additional embodiments, the one or more events includes a request for a secure communication link. For further embodiments, the method includes, based upon detecting the request for a secure communication link, forming a first secure connection including the network client and forming a second secure connection including the network server. For further embodiments, the method includes exchanging a first set of security keys with the network client to form the first secure connection and exchanging a second set of security keys with the network server to form the second secure connection. For further embodiments, the method includes decrypting and re-encrypting packets within the first secure connections using the first set of security keys, and decrypting and re-encrypting packets within the second secure connection using the second set of security keys. For still further embodiments, the method further includes analyzing contents of decrypted packets and taking one or more actions based upon the analyzing.

For one embodiments, a system is disclosed to monitor server network traffic having a network server configured to received packet traffic and one or more programmable integrated circuits including at least one of a processor or a configurable logic device programmed to monitor the packet traffic for the network server, allow a traffic session to be formed between the network client and the network server based upon a connection request from the network client, monitor the traffic session to detect one or more events, and based upon a detection of the one or more events, initiate a proxied session between the network client and the network server. For further embodiments, the network server is configured to provide one or more network services to the network client.

For additional embodiments, the one or more programmable integrated circuits are further programmed to initiate the proxied session by splitting the traffic session into a first connection including the network client and a second connection including the network server. For further embodiments, the one or more programmable integrated circuits are further programmed to analyze contents of packets within the proxied session to identify one or more network threats. For still further embodiments, the one or more programmable integrated circuits are further programmed to take one or more actions with respect to the network server based upon identification of the one or more network threats.

For additional embodiments, the one or more events includes a request for a secure communication link. For further embodiments, the one or more programmable integrated circuits are further programmed to, based upon detection of the request for a secure communication link, form a first secure connection including the network client and form a second secure connection including the network server. For further embodiments, the one or more programmable integrated circuits are further programmed to exchange a first set of security keys with the network client to form the first secure connection and exchange a second set of security keys with the network server to form the second secure connection. For still further embodiments, the one or more programmable integrated circuits are further programmed to decrypt and re-encrypt packets within the first secure connections using the first set of security keys, and decrypt and re-encrypt packets within the second secure connection using the second set of security keys. For further embodiments, the one or more programmable integrated circuits are further programmed to analyze contents of decrypted packets and take one or more actions based upon the analyzing.

Different or additional features, variations, and embodiments can be implemented, if desired, and related systems and methods can be utilized, as well.

DESCRIPTION OF THE DRAWINGS

It is noted that the appended drawings illustrate only example embodiments and are, therefore, not to be considered limiting of their scope, for the illustrated embodiments may admit to other equally effective embodiments.

DETAILED DESCRIPTION

Methods and systems are disclosed that provide in-session splitting of network traffic sessions for monitoring of traffic between network clients and network servers. This in-session splitting is based upon monitoring the traffic sessions for one or more events and then initiating a proxied session based upon detection of the one or more events. For further embodiments, the creation of the proxied session is implemented based upon detection of a request for a secure link with the session traffic, and the proxied session is be implemented such that original session participants are not aware of the proxied session. The encrypted secure communications between the network client and the network server are split into two connections with one including the network client and one including the network server. Each connection is then decrypted and re-encrypted from so that the contents of the secure link can be analyzed to identify network threats and/or other desired network related activities. Other features and variations can be implemented, if desired, and related systems and methods can be utilized, as well.

Figure 1:
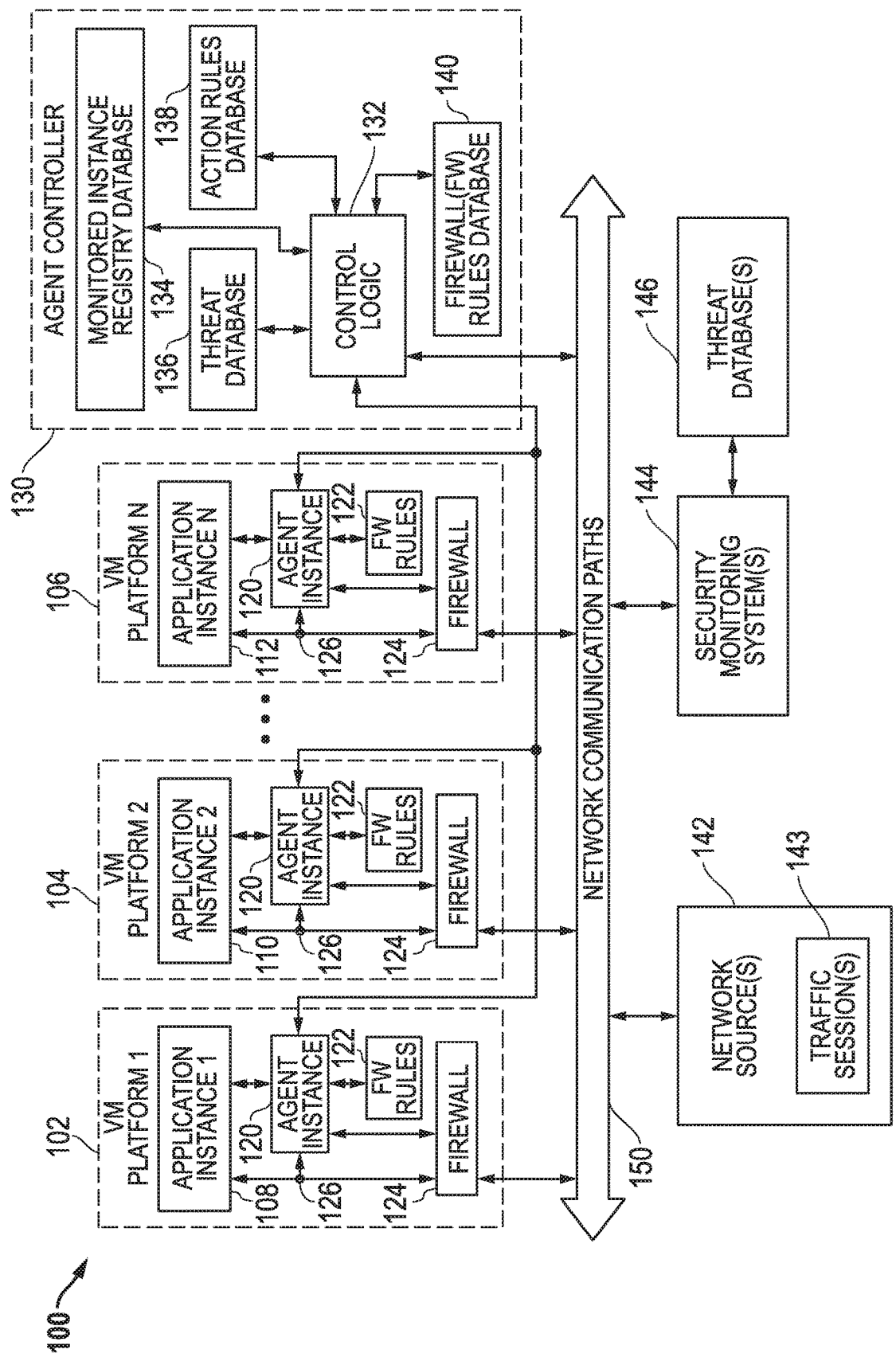
FIG. 1 is a block diagram of an example embodiment for a virtual processing environment including client agent instances enforcing firewall rules for application instances running within virtual processing platforms.
Figure 2:
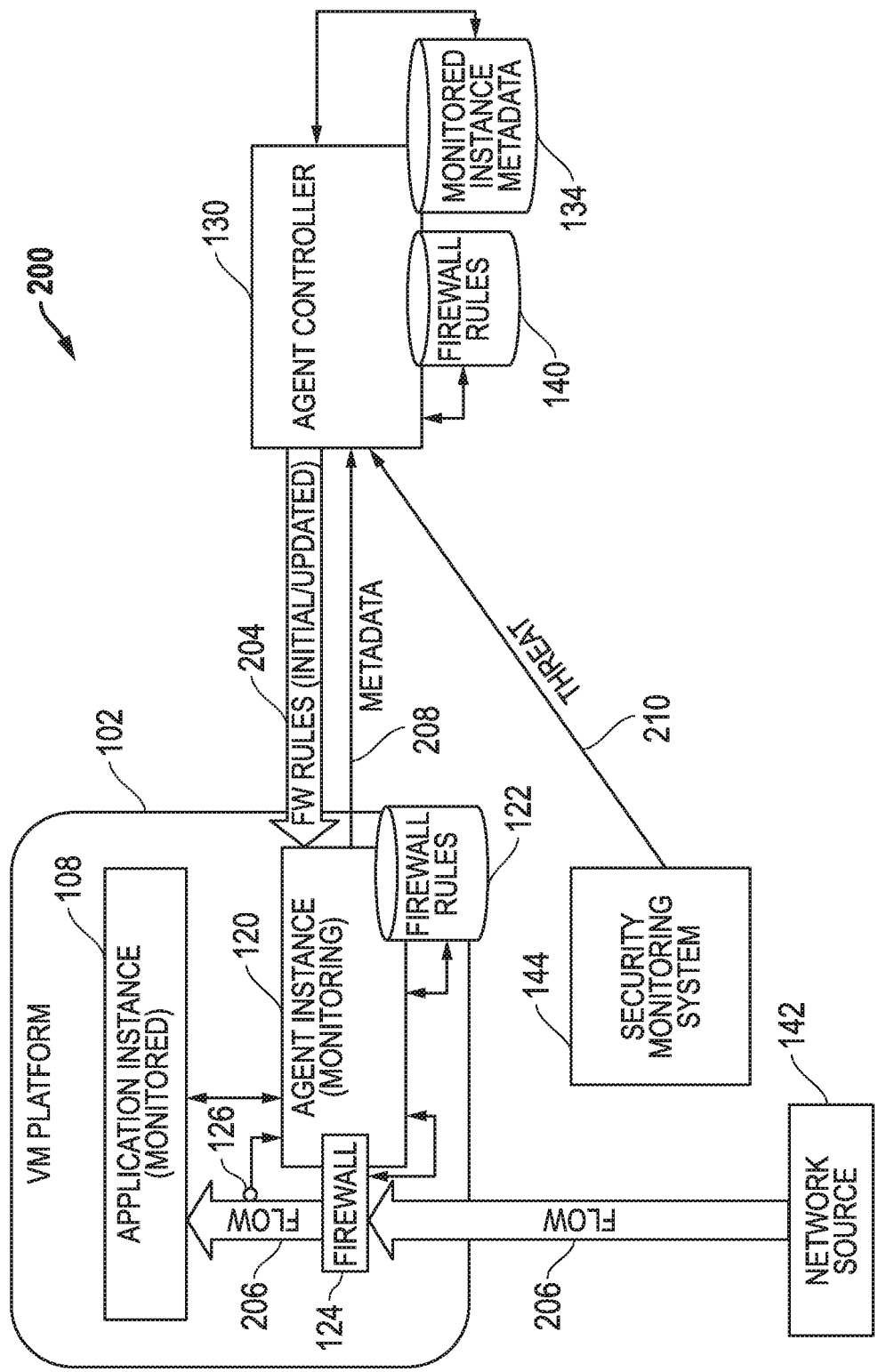
FIG. 2 is a block diagram of an example embodiment of a network environment where firewall rules are provided from an agent controller to an agent instance and are then applied to a firewall to control traffic flow from a network source to an application instance.
Figure 3:
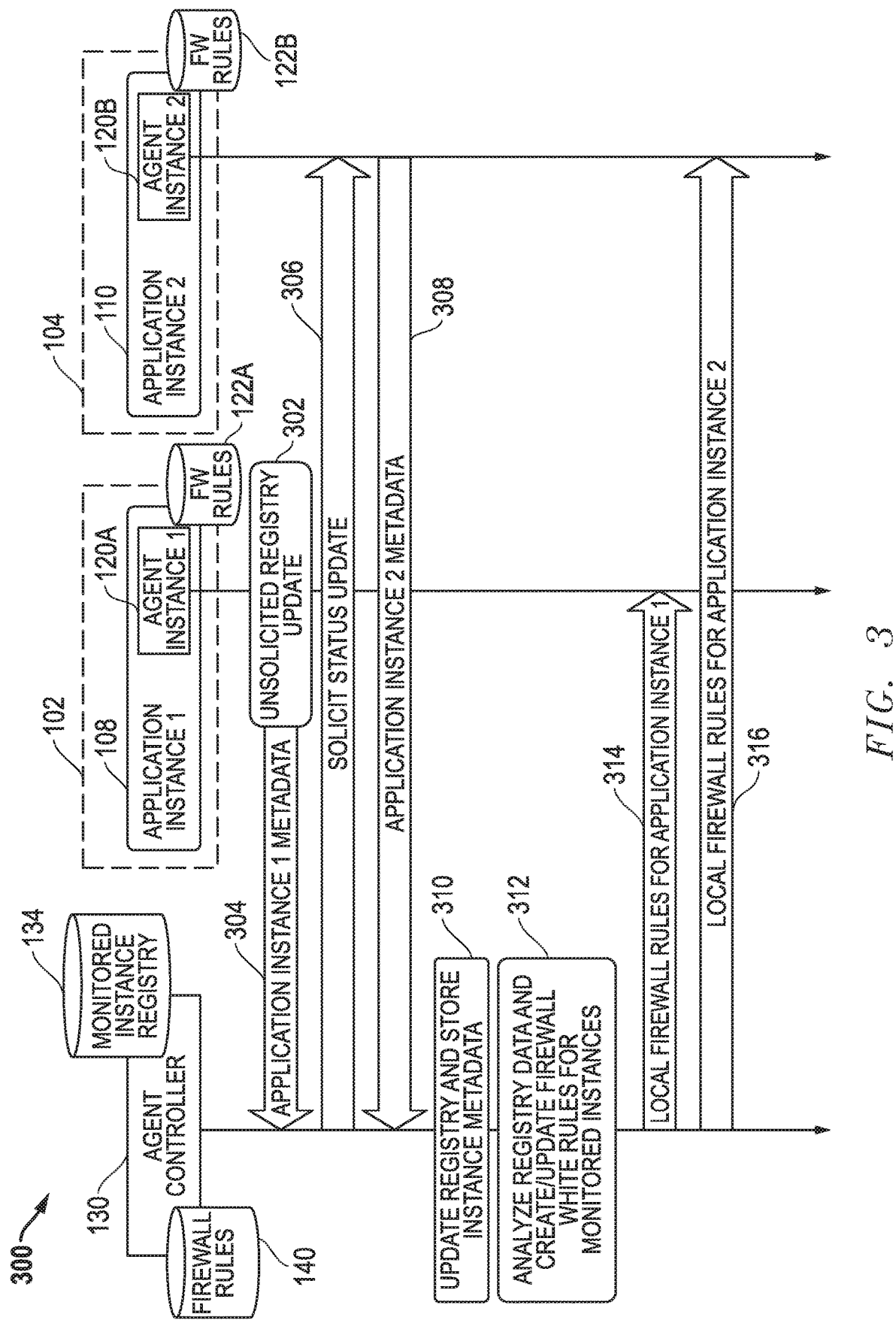
FIG. 3 is a swim lane diagram of an example embodiment for agent instances that are monitoring application instances and that receive firewall rules from a firewall rules database maintained by an agent controller.
Figure 4:
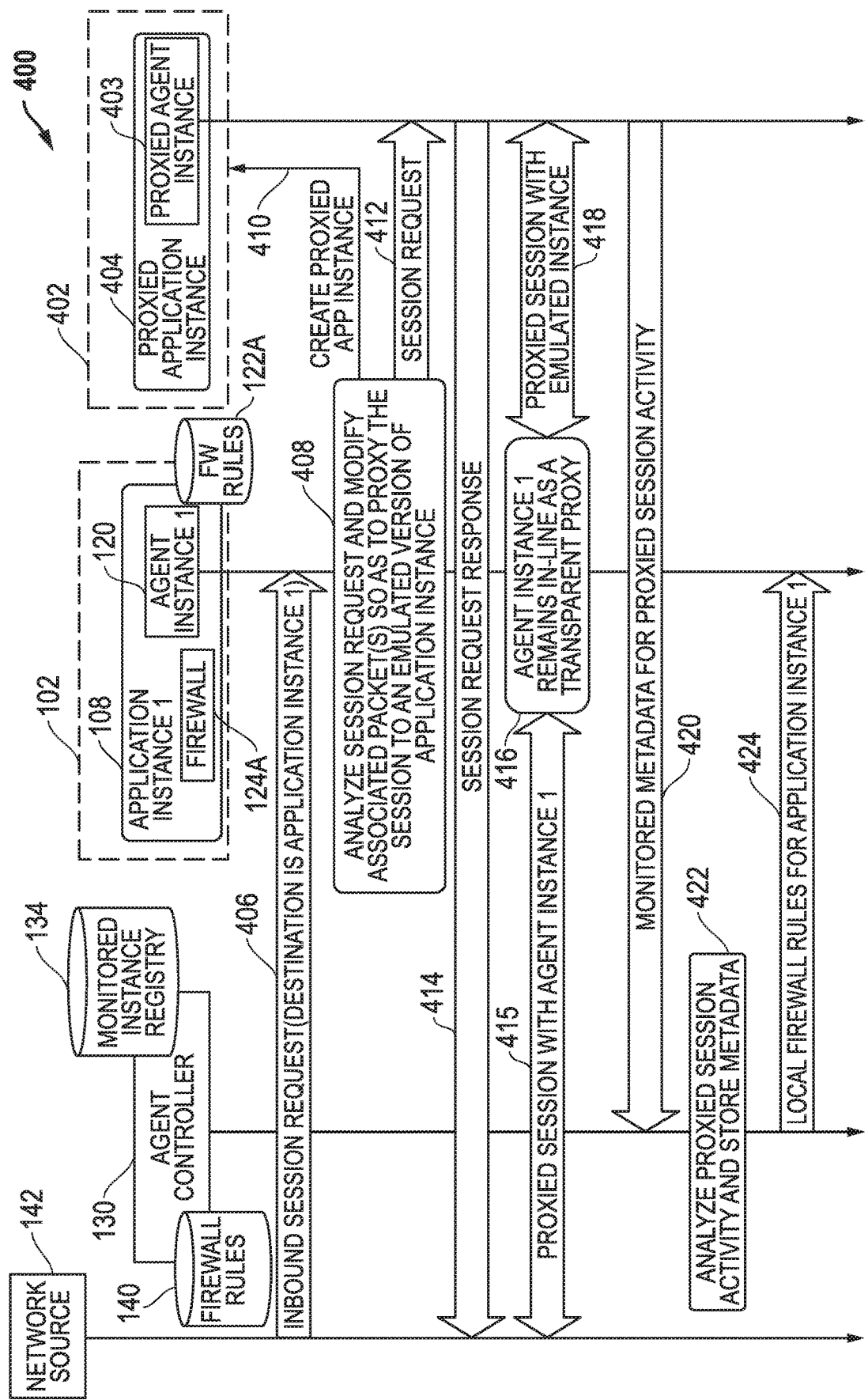
FIG. 4 is a swim lane diagram of an example embodiment for an agent instance that is monitoring an application instance and that creates a proxied session including a second application instance that acts as a proxy for the original application instance.
Figure 5:
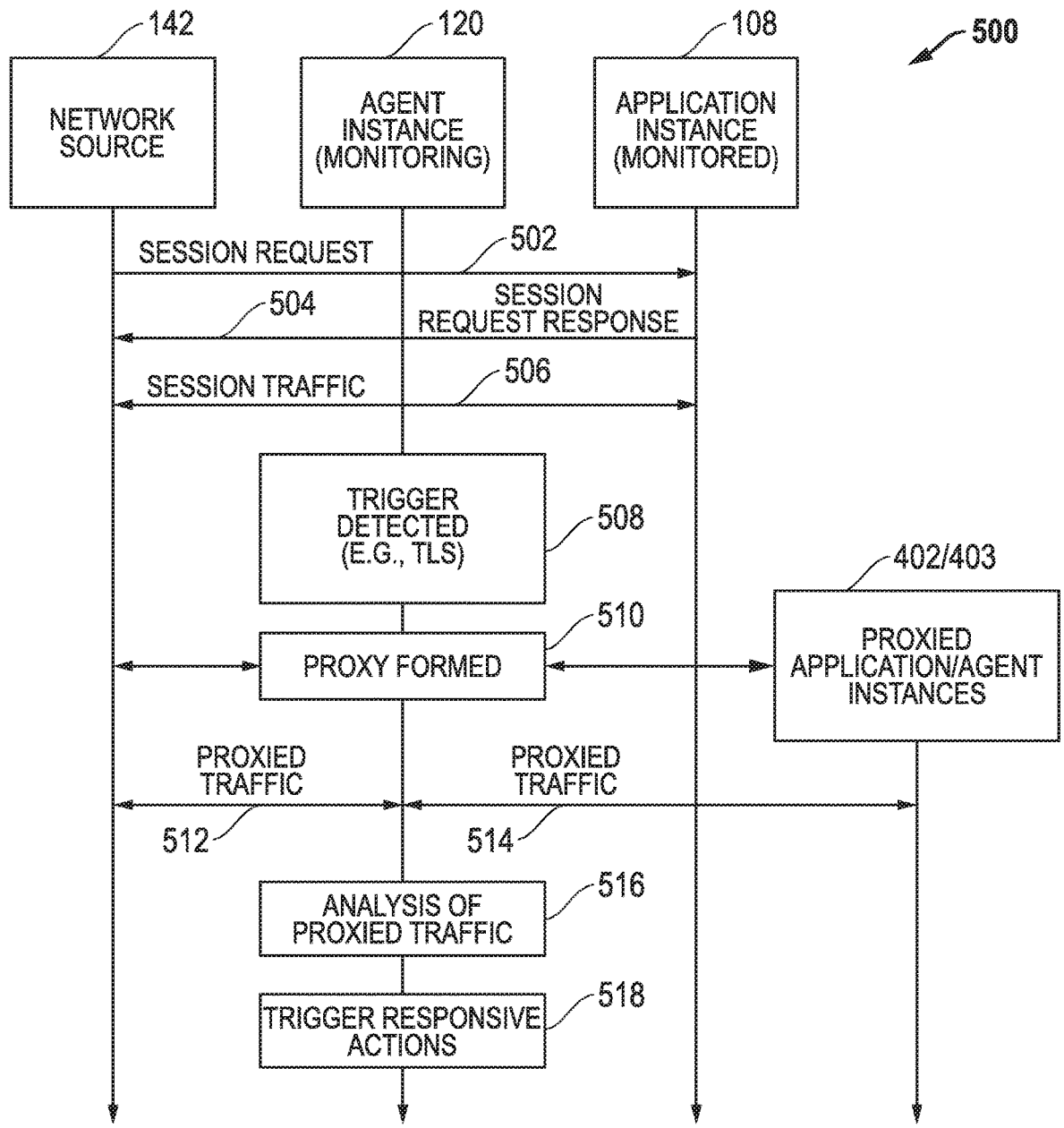
FIG. 5 is a swim lane diagram of an example embodiment where a session is monitored by an agent instance and is then split into two connections for a proxied session including the original network source and a proxied application instance and related agent instance.
Figure 6A:
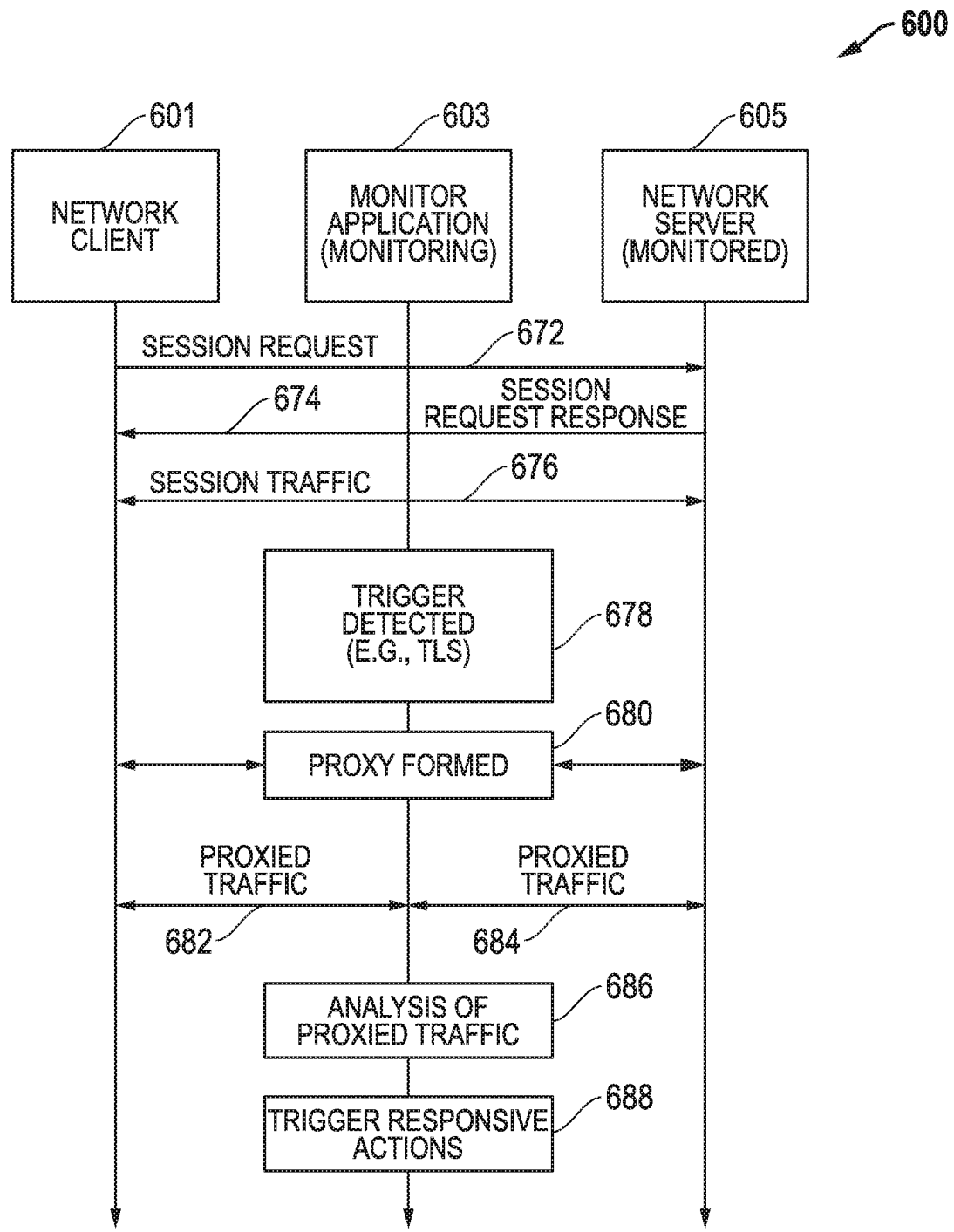
FIG. 6A is a swim lane diagram of an example embodiment where a session is monitored by a monitor application, which can run in any desired environment, and is then split into two connections for a proxied session including the original network client and network server for the session.
Figure 6B:
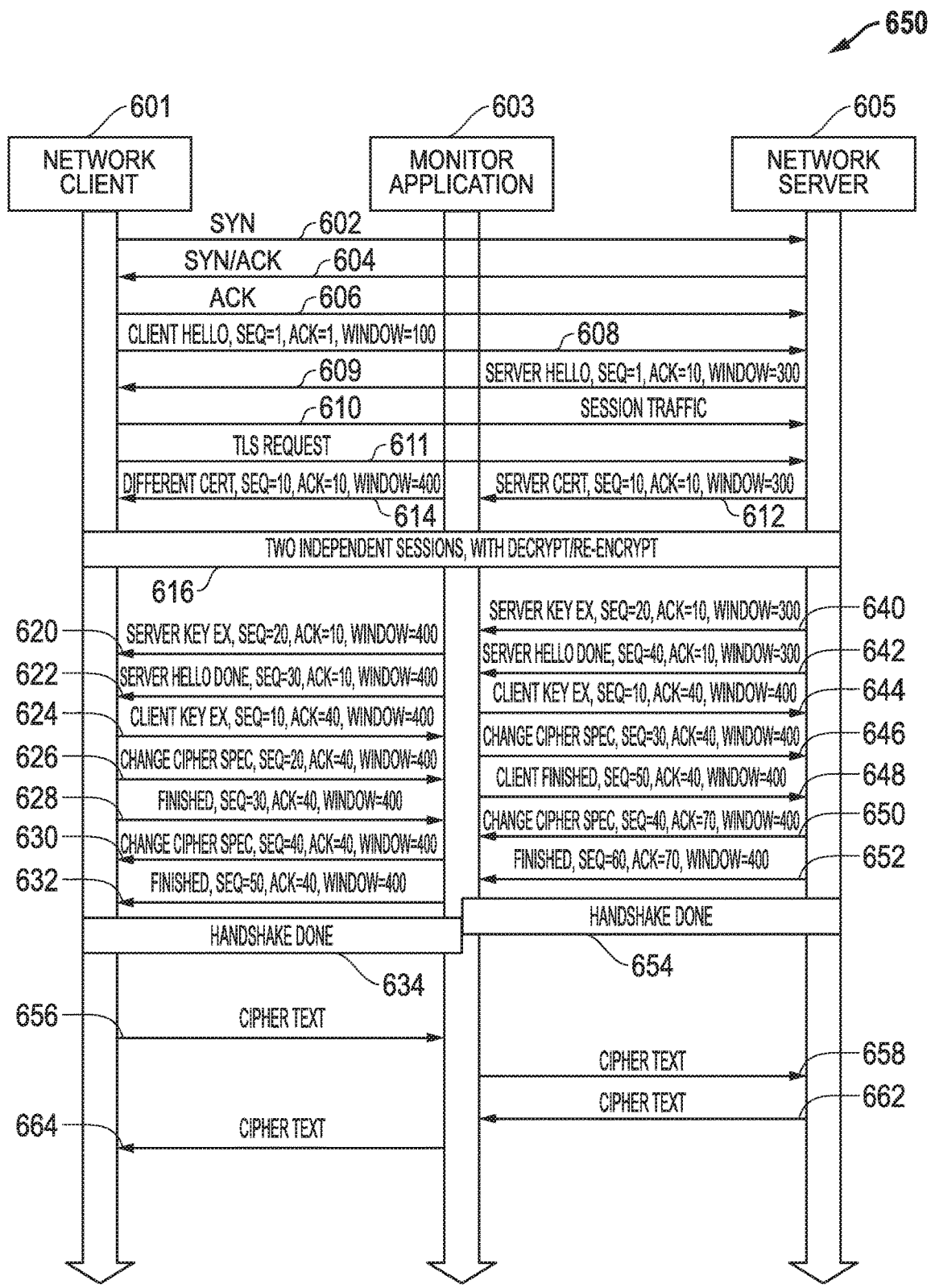
FIG. 6B is a swim lane diagram of an example embodiment where a monitor application acts as a man-in-the middle between a network client and a network server for a proxied session created after initiation of a traffic session and a request for a secure link.
Figure 7:
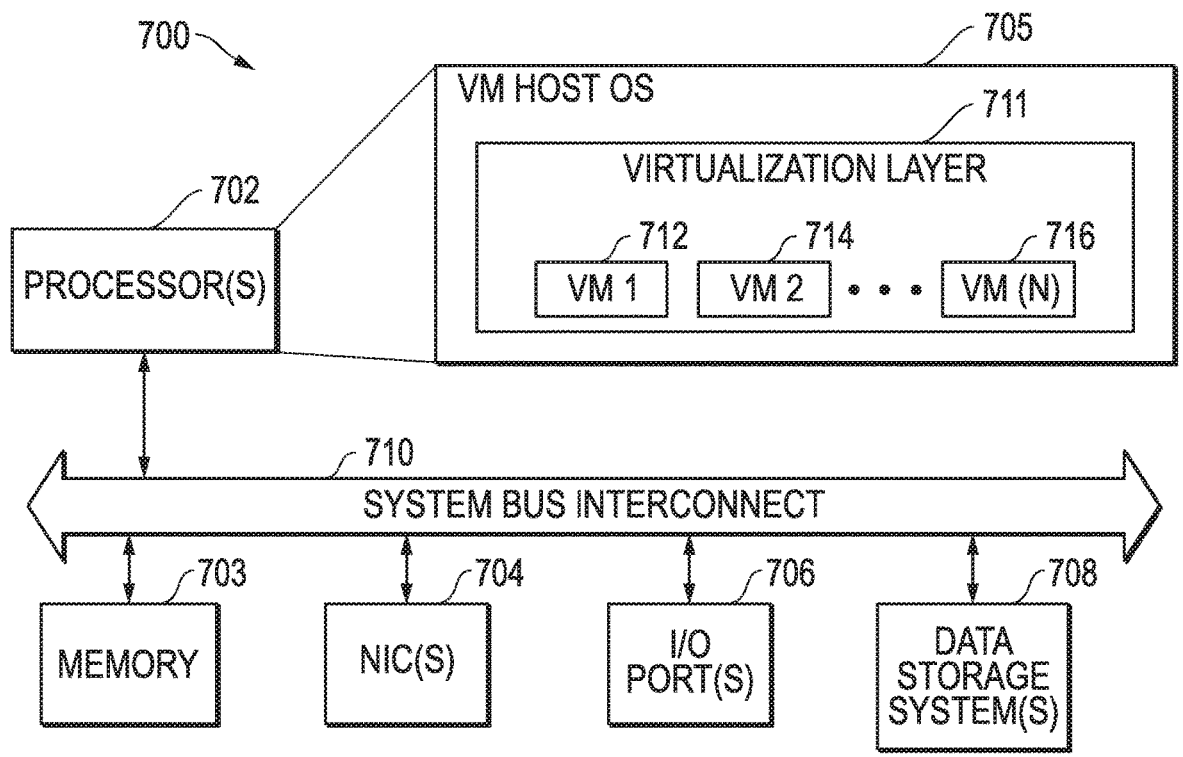
FIG. 7 is a block diagram of an example embodiment for a virtual platform host server.
Figures 8A, 8B:
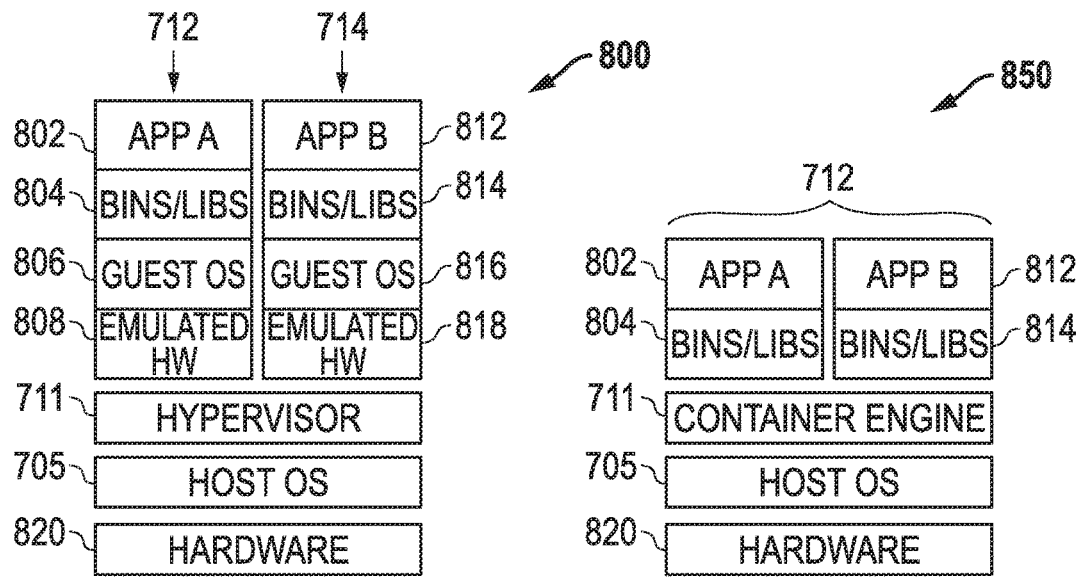
FIG. 8A is a block diagram of an example embodiment for a host server that uses a hypervisor to provide a virtualization layer.
FIG. 8B is a block diagram of an example embodiment for a host server that uses a container engine to provide a virtualization layer.

Example embodiments are now described in more detail with respect to the drawings. With respect to in-session splitting of traffic sessions, FIGS. 5 and 6A-B provide example embodiments where a traffic session is allowed to be formed, and a proxied session is later created after detection of one or more events within the traffic session. FIGS. 1-3 provide example embodiments for virtual processing environments including virtual platforms, application instances, firewalls, and related monitor agent instances along with a central agent controller that dynamically controls the firewall rules through the agent instances. FIG. 4 provides an example embodiment where the firewall rules include instructions to create a proxied session for detected events using a proxied application instance and related agent instance. FIGS. 7 and 8A-B provide example hardware/software environments. It is further noted that other variations and features can also be implemented while still taking advantage of the firewall control techniques and proxied session techniques described herein.

Advantageously, through the operation of the proxied session directed to the proxied application instance and related network service, certain disclosed embodiments can determine when a legitimate network source is not passed by whitelist, blacklist, or other firewall rules and has been improperly labeled as a "bad" actor. Because the actual packets from the legitimate network source are processed and analyzed by an agent instance with respect to the proxied session, a determination can be made that the network source and/or its activities are not a risk and should be allowed. Once this determination is made, the monitoring agent instance can send return values or messages to the network source indicating that the communications from the network source have been intercepted by a security policy and that the network source is communicating with a "fake" network service. Further, the agent instance can send a message to the network source indicating procedures to take to modify security policies so that access to the real network service will be allowed. Other notification messages could also be sent, for example, to a network manager indicating that a legitimate network source was blocked.

In addition, certain disclosed embodiments can analyze and assess the actual activities of a network source that is truly a "bad" actor. In contrast, prior solutions typically drop packets from network sources not passed by firewall rules very early in a session and little can be determined about the "bad" network source. For example with respect to TCP (transmission control protocol) communications, an early blocking decision is often based upon a SYN (synchronization) packet associated with the initial TCP setup based upon the source address of the network source. However, because TCP setup is not allowed to complete, a determination cannot be made about what the network source was actually trying to do as a "bad" actor. By redirecting the packets to the proxied application instance and related network service as described for the disclosed embodiments, the "bad" actor is allowed to proceed. Once the TCP setup is completed, the network source starts interacting with the proxied network service. This allows the actual activity of the network service to be detected and analyzed. This detected activity and related analysis can provide important evidence concerning what the network source is actually trying to do. As indicated above, if it is deemed that the network source is not actually a bad actor then an update can be made to the whitelist, blacklist, or other firewall rules to allow the network source to have access to the real application instance and related network service. If the network source is determined to truly be a bad actor, then the information collected becomes security intelligence that can be used for future firewall rule updates and related activities. For example, if similar activity is detected from a network source that is already on a whitelist or otherwise allowed access by firewall rules, the designation for this network source can be changed. In other words, this detected "bad" activity can indicate that a network source is on the whitelist when it should not be and/or that the network source has become unsafe. For example, a network source such as an employee laptop can be whitelisted and then become unsafe where the laptop is infected elsewhere with malware and then brought back into a network communication system for a company within which the employee works.

It is also noted that for some embodiments, the operation of the agent instance can be embedded as part of the firewall which automatically redirects packets from network source to a proxied service wherein the network source is not on a whitelist, is on a blacklist, and/or is otherwise blocked by firewall rules. The network communications can then be analyzed to determine if "bad" conduct is occurring with respect to the network source, and security intelligence can be acquired for any "bad" conduct detected by the proxied network service. Other variations could also be implemented while still taking advantage of the firewall control techniques and proxied session techniques described herein.

FIG. 1 is a block diagram of an example embodiment for a virtual processing environment 100 including client agent instances 120 enforcing firewall rules 122 for each of a plurality of application instances 108, 110 . . . 112 running within virtual machine (VM) platforms 102, 104 . . . 106.

The application instances 108, 110 . . . 112 are configured to provide network services and to form one or more network traffic sessions 143 with one or network sources 142 through network communication paths 150. An agent controller 130 provides centralized control of the firewall rules and operates to communicate with the agent instances 126 within each of the virtual platforms 102, 104 . . . 106. In addition, one or more security monitoring systems 144 can also communicate with the agent controller 130 through the network communication paths 150. The security monitoring system 144, for example, can be configured to monitor network traffic within the network communication paths 150 and to identify network threats. These threats can be stored within one more threat databases 146.

For the example embodiment depicted, a first application instance 108 runs within a first VM platform 102 and provides one or more network services for the network connected sources 142. Similarly, a second application instance 110 runs within a second VM platform 104 and provides one or more network services for the network connected sources 142. This continues for a plurality of VM platforms, and an Nth application instance 112 runs within an Nth VM platform 106 and provides one or more network services for the network connected sources 142. The application instances 108/110/112 can be instances for different applications that provide different network services, can be different instances for the same application that provides the same network services, or a combination of instances for different and same applications. In addition, multiple application instances can also be operated within a single VM platform 102/104/106. As described below, the VM platforms 102/104/106 can be implemented through a variety of techniques (e.g., hypervisor, container, etc.) to provide a virtual platform for application instances within a virtual processing environment.

A firewall 124 also operates within each of the VM platforms 102/104/106 and determines whether a particular network connected source 142 is allowed access to the application instance 102/104/106 and related network services operating within its respective VM platform 102/104/106. An application monitor agent instance 120 also operates within each of the VM platforms 102/104/106 and communicates with its respective firewall 124 to apply firewall (FW) rules 122 stored within a local database accessible to the agent instance 120. During operation for each VM platform 102/104/106, the firewall 124 uses the applied firewall rules 122 to determine whether to allow access to any particular network source 142 that is attempting to connect to the network service provided by the application instances 108/110/112. The agent instances 120 also monitor traffic flows for the application instances 108/110/112 by receiving copies of network packet traffic through a virtual TAP (test access port) 126. As described herein, the firewall rules 122 are received by the agent instance 120 within each VM platform 102/104/106 from the agent controller 130, and the firewall rules 122 can also include actions associated with particular detected activity, such as instructions to generate and use proxied session and related proxied application instances and related agent instances to provide proxied network services.

The agent controller 130 communicates with the agent instances 120 within each of the VM platforms 102/104/106 to store and update the firewall rules 122 stored in local databases. These firewall rules 122 are provided from the central firewall rules database 140 managed by the agent controller 130. Further, the agent controller 130 communicates with the agent instances 120 to collect information about the application instances 108/110/112 being monitored by the agent instances 120. This collected information or metadata is then stored within the monitored instance registry database 134. Further, the agent controller 130 communicates with one or more security monitoring systems 144 to receive threat information from the threat databases 146, and this threat information is stored within the threat database 136. One or more action rules are also stored within the database 138, and these action rules can be provided as part of the firewall rules to the agent instances 120 and can be stored as part of the firewall rules 122 within the local databases. As described further below, these actions can include creating and using a proxied network service to interact with one or more of the network sources 142. The control logic 132 for the agent controller 130 is configured to use the monitored instance registry database 134, the threat database 136, the action rules database 138, and/or the firewall rules data base 140 to dynamically manage the firewall rules 122 provided to the agent instances 120.

It is noted that the virtual TAPs 126 can be any desired virtual device that provides copies of network traffic for the application instances 108/110/112 to the agent instances 120 running in each of the VM platforms 102/104/106. It is also noted that the firewall rules 122 can include one or more parameters that identify a network source with respect to network communication directed to the instance applications 108/110/112. For example, the firewall rules 122 can use a variety of source identifiers such as source IP (internet protocol) addresses, geographic location as identifiers (e.g., Russia, China, etc.), and/or other source identifiers. The firewall rules 122 can also include communication types such as port numbers, connection protocols, and/or other communication related parameters. In certain embodiments, the firewall rules 122 include whitelists that are applied by the firewalls 124 such that communication access is not allowed unless a network source 142 is listed within the whitelist included as part of the firewall rules 122. In other embodiments, the firewall rules 122 include blacklists that are applied by the firewalls 124 such that communication access is allowed unless a network source 142 is listed within the blacklist included as part of the firewall rules 122. Other variations and combinations of firewall rules could also be implemented to control access by the network sources 142 to the application instances 108/110/112.

It is noted that the VM platforms 102/104/106 can be hosted within one or more host servers and are configured to communicate with each other through the network communication paths 150. The agent controller 130 can be implemented as a VM platform within one or more host servers, as a stand-alone processing system or device, and/or as a combination thereof. The network communication paths 150 can include wired network connections, wireless network connections, or a combination of wired and wireless network connections. In addition, the network communication paths 150 can include one or more intervening network communication devices or systems within a network communication infrastructure (e.g., routers, switches, gateways, servers, etc.) including the Internet. Further, one or more different communication protocols can be used within the network communication paths 150 to communicate network packets within the network communication paths 150. It is further noted that the communications between the agent controller 130 and the VM platforms 102/104/106 can occur through the network communication paths 150, through additional network communication paths, through direct out-of-band communication paths, and/or through other communication paths.

It is further noted that installing tap and application monitor functionality through the agent instances 120 and virtual TAPs 126 within each of the VM platforms 102/104/ 106 provides a number of advantages. For example, scaling is handled implicitly as the application monitor agent instances will scale directly with the scaling of the VM platforms and related application instances. New VM platforms will include monitor agent instances, and any reduction in the number of VM platforms will also remove any agent instances running in those client VM platform instances. In addition, from inside the VM platforms 102/ 104/106, the agent instances 120 have access to metadata in addition to the contents of the packets themselves, such as operating system (OS) information, platform metadata, processing metrics (e.g., CPU load), virtual environment types, hardware information, software information, and/or platform related data not within the packets themselves. It is further noted that U.S. patent application Ser. No. 14/873, 896, entitled "DIRECT NETWORK TRAFFIC MONITORING WITHIN VM PLATFORMS IN VIRTUAL PROCESSING ENVIRONMENTS" and filed Oct. 2, 2015, describes various embodiments including packet monitoring embodiments where client monitor applications are installed and operated within VM platforms. This U.S. patent application Ser. No. 14/873,896 is hereby incorporated by reference in its entirety.

Still further, it is noted that the firewall rules 122, firewall rules database 140, monitored instance registry database 134, threat database 136, and action rules database 138 can be stored within one or more data storage systems, and these data storage systems can be implemented using one or more non-transitory tangible computer-readable mediums such as FLASH memory, random access memory, read only memory, programmable memory devices, reprogrammable storage devices, hard drives, floppy disks, DVDs, CD-ROMs, and/or any other non-transitory data storage mediums. It is also noted that the VM platforms 102/104/106 and/or the agent controller 130 can be implemented using one or more programmable integrated circuits to provide the functionality described herein. For example, one or more processors (e.g., microprocessor, microcontroller, central processing unit, etc.), configurable logic devices (e.g., CPLD (complex programmable logic device), FPGA (field programmable gate array), etc.), and/or other programmable integrated circuit can be programmed with software or other programming instructions to implement the functionality described herein. It is further noted that software or other programming instructions for such programmable integrated circuits can be implemented as software or programming instructions embodied in one or more non-transitory computer-readable mediums (e.g., memory storage devices, FLASH memory, DRAM memory, reprogrammable storage devices, hard drives, floppy disks, DVDs, CD-ROMs, etc.) that when executed by the programmable integrated circuits cause them to perform the processes, functions, and/or capabilities described herein.

Looking now to FIGS. 2-3, example embodiments are provided where application instances that provide network services are monitored by agent instances that receive, store, and enforce firewall (FW) rules (e.g., whitelist rules, blacklist rules, and/or other firewall rules) in addition to performing other application monitoring activities.

FIG. 2 is a block diagram of an example embodiment of a network environment 200 where firewall (FW) rules 204 are provided from the agent controller 130 to the agent instance 120 and then applied to a firewall 124 to control traffic flow 206 from a network source 142 to an application instance 108. The agent instance 120 monitors an application instance 108 operating within a VM platform 102 that is in turn operating within an elastic virtual processing environment hosted by one or more servers. As such, the application instance 108 is monitored and metadata 208 associated with the operation of the application instance 108 can be reported to the agent controller 130. This metadata 208 can then be stored within a monitored instance registry database 134 by the agent controller 130, and this stored metadata from various monitored application instances can then be used to generate firewall rules 140. A security monitoring system 144 may also be operating within the network environment 200 and provide network threat data 210 to the agent controller 130, and the agent controller 130 can use this threat data 210 to generate firewall rules 140. The agent controller 130 provides initial and updated firewall rules 204 to the agent instance 120 that are stored in the local firewall rules 122. The agent controller 130 can send updates periodically, can send updates based upon one or more detected network events, and/or can send updates based upon other desired criterion. The agent instance 120 applies the initial and/or updated firewall rules 122 to the firewall 124. The firewall 124 then uses the firewall rules 122 to determine whether the network source 142 will be allowed access to the application instance 108. If access is allowed, then the network packets within traffic flow 206 from the network source 142 are allowed through the firewall 124 so that they reach and interact with the application instance 108. If access is not allowed, the traffic flow 206 is not allowed to pass through to the application instance 108. As described below for some embodiments, the traffic flow 206 is redirected to a proxied application instance and related network service for further monitoring and analysis.

FIG. 3 is a swim lane diagram of an example embodiment 300 for agent instances 120A/120B that are monitoring application instances 108/110 and that receive firewall rules 122A/122B from a firewall rules database 140 maintained by an agent controller 130. The first application instance 108 is operating within a first VM platform 102, and the second application instance 110 is operating within a second VM platform 104. Initially, for example embodiment 300 as indicated by arrow 304, the first agent instance 120A reports metadata associated with the first application instance 108 to the agent controller 130 as part of an unsolicited registry update 302. For example, this unsolicited registry update 302 can be a periodic collection and transmission of metadata by the first agent instance 120A. For the example embodiment 300 as indicated by arrows 306 and 308, the second agent instance 120B reports metadata to the agent controller 130 associated with the second application instance 110 based upon a solicited status update communicated by the agent controller 130 to the second agent instance 120B. These solicited updates can be performed periodically by the agent controller 130 and/or can be based upon one or more detected events. As indicated by block 310, the agent controller 130 receives the metadata 304/308 from the agent instances 120A/120B and stores it within the monitored instance registry database 134. As indicated by block 312, the agent controller 130 is also configured to analyze the registry data to create and/or update firewall rules 140 for the monitored instances 108/110. As described herein, threat information from one or more security monitoring systems 144 can also be used to create and/or update the firewall rules 140. As indicated by arrow 314, the agent controller 130 sends local firewall rules to the first application instance 120A, and these firewall rules are stored locally by the first agent instance 120A as firewall rules 122A. As indicated by arrow 316, the agent controller 130 sends local firewall rules to the second application instance 120B, and these firewall rules are stored locally by the second agent instance 120B as firewall rules 122B. The agent controller 130 can also send updates for the firewall rules 122A/122B periodically, can send updates based upon one or more network events, can send updates based upon additional analyses of metadata within the monitored instance registry database 134, and/or can send updates based upon other criterion.

Looking to FIG. 4, an example embodiment is provided where firewall rules include instructions to create a proxied application instance for a monitored application instance and to redirect network traffic from a network source to the proxied application instance. The proxied application instance operates such that it is transparent to the network source, and network traffic with respect to the proxied application instance is monitored and analyzed to determine and assess the actual intended activity of the network source with respect to the original application instance.

FIG. 4 is a swim lane diagram of an example embodiment 400 for an agent instance 120 that is monitoring application instance 108 and that creates a proxied session including a second application instance 402 to act as a proxy for the first application instance 108. Initially, as indicated by arrow 406, an inbound session request, which has the first application instance 108 as its destination, is sent by a network source 142 and is received by the first application instance 108 operating within a first VM platform 102. As indicated by block 408, the firewall 124A applies firewall (FW) rules 122A to this session request, and it is assumed that the firewall 124A identifies it as a non-allowed or "bad" request based upon the firewall rules 122A. As also indicated by block 408, the agent instance 120 within the first application instance 108 analyzes the session request and modifies the associated packets so as to proxy the session to an emulated or proxied version of the application instance. As indicated by arrow 410, this proxied application instance 404 is created along with a proxied agent instance 403. The proxied application instance 404 can be created within an additional VM platform 402 although the proxied application instance 404 could also be created within the first VM platform 102. In addition, as indicated by arrow 412, the inbound session request is forwarded on to the proxied application instance 403, and a session request response is sent back to the network source 142 as indicated by arrow 414.

As shown with respect to arrows 415/418 and block 416, the session request and related activity is allowed to continue without endangering the original first application instance 108. As indicated by block 416, the agent instance 120 remains in-line with respect to the session packet communications as a transparent proxy so that the network source 142 will not be aware that the session has been proxied. As indicated by arrow 415, packets for the proxied session are communicated between the network source 142 and the agent instance 120 as if the network source 142A were actually communicating with the first application instance 108. As indicated by arrow 418, packets for the proxied session are communicated between the agent instance 120 and the proxied agent instance 403 within the proxied application instance 404. Effectively operating as a man-in-the-middle device, the first agent instance 120 modifies or encapsulates packets from the network source 142 to include destination addresses for the proxied application instance 404. The return packets from the proxied application instance 404 are then again modified or un-encapsulated to remove these proxied destination addresses so that the return packets to the network source 142 appear to be packets from the first application instance 108.

Based upon the in-line participation of the agent instance 120 and the proxied application instance 404, the intended activity by the network source 142 can be monitored, collected, and analyzed without endangering the first application instance 108. As indicated by arrow 420, monitored metadata associated with the proxied session activity can then be communicated by the proxied agent instance 403 to the agent controller 130. As indicated by block 422, the agent controller 130 can further analyze the session activity and can stored the monitored metadata within the monitored instance registry database 134. This metadata for the proxied session can also be used to generate new and/or update firewall rules for the initial application instance 108. As indicated by arrow 424, these update firewall rules can be communicated form the agent controller 130 to the first application instance 108 and/or to other application instances operating within the virtual processing environment.

As described herein, the analysis of the proxied session activity can determine, for example, whether the activity by the network source 142 is actually a potential threat or risk to the application instance 108. If it is determined that the activity is not a risk, then the firewall rules 122A for the first application instance 108 can be updated to allow the network source 142 to access the application instance 108 and its related network services. In addition, one or more messages can be sent by the agent controller 130 and/or the agent instances 120/403 to the network source 142, to a network management system, and/or to another network destination to indicate that the activity was initially identified as activity to block and was then determined to be non-threatening activity. If it is determined that the activity is in fact a risk or threat to the network or the application instance, then the collected data for the proxied session can be used to update or otherwise improve the recognition of future similar activity. For example, updated firewall rules based upon the detected activity with respect to the proxied session can be pushed to the agent instance 120 and/or to agent instances operating with respect to similar application instances within the virtual processing environment. Still further, the proxied session can be terminated after it has been confirmed to be a risk or threat to the network or after it has been determined that there is no risk or threat to the network. Other variations could also be implemented while still taking advantage of the proxied session techniques described herein.

Looking now to FIGS. 5 and 6A-B, example embodiments are provided where a decision to create a proxied session is delayed after initiation of a traffic session until a later trigger event. For example, for the embodiments described above, a decision can be made based upon packet contents of an initial session request to create a proxied session. For example, a source IP address, a source geographic region, and/or other request related parameter can be used with respect to the initial session request to trigger the creation of a proxied session. Once the proxy is initiated, the agent instance then acts as the man-in-the-middle thereby requiring additional workload and packet traffic. With respect to the embodiments of FIGS. 5 and 6A-B, the decision to initiate the proxy is delayed until a later trigger event that occurs during the session. For example, a request for a secure link, a request to connect to a particular website, and/or other trigger event detected with respect to session traffic can be used to create the proxied session. As such, if a trigger event never occurs, then no proxy is initiated and the agent instance is not required to increase workload and packet traffic to handle the proxied application/agent instances. If a trigger event does occur, then the proxy is still initiated but the agent instance has not been acting as the man-in-the-middle for the earlier session traffic. In short, the later decision to initiate the proxy based upon trigger events within the session traffic provides a more efficient solution that potentially reduces workload and packet traffic.

For prior solutions, proxies are typically non-transparent and terminate the current connection before initiating a new connection. This termination and re-initiation makes it obvious to a network source that the communication session has changed and a proxy has been initiated. In addition with prior solutions, once a proxy has been initiated, it is often difficult to seamlessly handoff the connection to the original participants and terminate the proxy if it is later determined that the proxy is not needed.

The embodiments of FIGS. 5 and 6A-B are helpful to avoid potential inefficiencies associated with initiating a proxy at an initial session request and then later deciding a proxy was not needed. The embodiments of FIGS. 5 and 6A-B are also helpful to create a proxy after a session has been initiated without making it apparent that a proxy has been created. As such, a network source having non-legitimate intentions with respect to an application instance will not realize that its activities are being monitored. As described below, a single connection is split into two connections based upon a trigger event with the agent instance acting as a man-in-the-middle so that the monitoring of the session activities is transparent to the network source. In additional embodiments, connection parameters can also be copied when the connection is split to provide seamless transitions while maintaining transparency.

FIG. 5 is a swim lane diagram of an example embodiment 500 where a session is monitored by an agent instance 120 and then split into two connections for a proxied session including the original network source 142 and a proxied application instance 402 and associated agent instance 403. Initially as indicated by arrow 502, a session request is first sent from the network source 142 to the application instance 108 which is being monitored by the agent instance 120. Rather than initiate a proxy at this point, the agent instance 120 continues to monitor the traffic. As indicated by arrow 504, a session request response is sent from the application instance 108 to the network source 142. As indicated by arrow 506, session traffic then continues between the network source 142 and the application instance 108 as the network source 142 uses the network services provided by the application instance 108. The agent instance 120 continues to monitor the session traffic during these communications. As indicated by block 508, a trigger event is later detected by the agent instance 120. The trigger event can be one or more of a variety of different detected events associated with the session traffic, such as for example, a request for a secure link and/or other traffic related events. One example trigger event is a request for a transport layer security (TLS) link with the application instance 108.

After the trigger event as indicated by block 510, the application instance 108 forms a proxied session associated with the session traffic by splitting the connection into two connections and by creating a proxied application instance 402 and related agent instance 403. As such, a first proxied connection with related proxied traffic 512 is created between the network source 142 and the agent instance 120. A second proxied connection and related proxied traffic 514 is formed between the agent instance 120 and the proxied application/agent instances 402/403. As indicated by block 516, the proxied traffic is then analyzed, for example, by agent instance 120 and/or the agent controller 130. As indicated by block 518, responsive actions can also be triggered through this analysis based upon one or more detected events and/or other criterion. Other variations could also be implemented while still taking advantage of the firewall control techniques and proxied session techniques described herein.

It is noted that the splitting of a connection into two connections for a proxied session can also be used more generically for any monitoring environment between a network client and a network server. The monitoring and connection splitting can be performed by a monitor application operating within any desired processing environment. FIG. 6A provides an embodiment for this more generic application, and FIG. 6B provides an embodiment where a session is split based upon a request for a secure link. For this latter embodiment, the connection splitting and subsequent proxied session allows for secure communications and activities to be monitored even though the original session participants believe a secure link has been established.

Looking to FIG. 6A, a swim lane diagram is provided of an example embodiment 600 where a session is monitored by a monitor application 603, which can run in any desired environment, and is then split into two connections for a proxied session including the original network client 601 and network server 605 for the session. With respect to the embodiment 500 of FIG. 5, the network client 601 correlates to the network source 142; the monitor correlates to the agent instance 120, and the network server 605 correlates to the application instance 108. As such, the flow for embodiment 600 is similar to the flow for embodiment 500 except that a proxied instance/server is not setup for embodiment 600.

Initially as indicated by arrow 672, a session request is first sent from the network client 601 to the network server 605 which is being monitored by the monitor application 603. Rather than initiate a proxy at this point, the monitor application 603 continues to monitor the traffic. As indicated by arrow 674, a session request response is sent from the network server 605 to the network client 601. As indicated by arrow 676, session traffic then continues between the network client 601 and the network server 605 as the network client 601 uses network services provided by the network server 605. The monitor application 603 continues to monitor the session traffic during these communications. As indicated by block 678, a trigger event is later detected by the monitor application 603. The trigger event can be one or more of a variety of different detected events associated with the session traffic, such as for example, a request for a secure link and/or other traffic related events. One example trigger event is a request for a transport layer security (TLS) link with the network server 605. After the trigger event as indicated by block 680, the monitor application 603 forms a proxied session associated with the session traffic by splitting the connection into two connections. As such, a first proxied connection with related proxied traffic 682 is created between the network client 601 and the monitor application 603. A second proxied connection and related proxied traffic 684 is formed between the monitor application 603 and the network server 605. As indicated by block 686, the proxied traffic is then analyzed, for example, by monitor application 603. As indicated by block 688, responsive actions can also be triggered through this analysis based upon one or more detected events and/or other criterion. Other variations could also be implemented while still taking advantage of the proxied session techniques described herein.

FIG. 6B is a swim lane diagram of an example embodiment 650 where an monitor application 603 acts as a man-in-the middle between a network client 601 and a network server 605 for a proxied session created after initiation of a traffic session and where the traffic session is split into two proxied connections. It is noted that for the example embodiment 650, the monitor application 603 does not create a proxied network server but rather allows the network client 601 to have access to the original network server 605. In other embodiments, a proxied network server could also be created similar to the embodiment 500 in FIG. 5. It is also noted that for the example embodiment 650, it is assumed that TCP (transmission control protocol) communication session is formed, that a TLS (transport layer security) link is requested during the session, and that this TLS link request triggers the proxy.

Initially, as indicated by arrow 602, a SYN (synchronization) message is sent from the network client 601 to the network server 605 being monitored by monitor application 603 to form a TCP connection. As indicated by arrow 604, a SYN/ACK (synchronization acknowledge) message is then sent back by the network server 605 to the network client 601. As indicated by arrow 606, an ACK (acknowledge) message is then sent from the network client 601 to the network server 605. A "Client Hello" message is sent from the network client 601 to the network server 605 (e.g., seq=1, ack=1, window=100) as indicated by arrow 608. A "Server Hello" message is sent from the network server 605 to the network client 601 (e.g., seq=1, ack=10, window=300) as indicated by arrow 609. TCP session traffic then occurs as indicated by arrow 610.

At some point with the session, the network client 601 requests a TLS link and sends a request as indicated by arrow 611. This TLS request is detected by the monitor application 603 and triggers the creation of the proxied session and related communication connections. When the network server 605 responds with a server certificate (Server Cert) message (e.g., seq=10, ack=10, window=300) as indicated by arrow 612, the monitor application 604 inserts itself as the man-in-the-middle and sends a different certificate (Different Cert) message (e.g., seq=10, ack=10, window=400) to the network client 601 as indicated by arrow 614. As indicated by block 616, this initiates the creation of two independent sessions where the monitor application 603 decrypts and re-encrypts messages between the network client 601 and the network server 605. The monitor application 603 is thereby able to read and analyze the contents of the encrypted messages.

Looking first to the handshake communications between the monitor application 603 and the network server 605, a server key exchange (Server Key Ex) message (e.g., seq=20, ack=10, window=300) is sent from the network server 605 to the monitor application 603 as indicated by arrow 640. A server done (Server Hello Done) message (e.g., seq=40, ack=10, window=300) is then also sent from the network server 605 to the monitor application 603 as indicated by arrow 642. A client key exchange (Client Key Ex) message (e.g., seq=10, ack=40, window=400) is sent from the monitor application 603 to the network server 605 to as indicated by arrow 644. A cipher change specification (Change Cipher Spec) message (e.g., seq=30, ack=40, window=400) is also sent from the monitor application 603 to the network server 605 as indicated by arrow 646. A client finished (Client Finished) message (e.g., seq=50, ack=40, window=400) is then sent from the monitor application 603 to the network server 605 as indicated by arrow 648. A cipher change specification (Change Cipher Spec) message (e.g., seq=40, ack=70, window=400) is then sent from the network server 605 to the application monitor 603 as indicated by arrow 650. A server finished (Finished) message (e.g., seq=60, ack=70, window=400) is then sent from the network server 605 to the monitor application 603 the as indicated by arrow 652. As indicated by block 654, the handshake is complete at this point and the TLS link is active.

Looking next to the handshake communications between the monitor application 603 and the network client 601, a server key exchange (Server Key Ex) message (e.g., seq=20, ack=10, window=400) is sent from the monitor application 603 to the network client 601 as indicated by arrow 620. A server done (Server Hello Done) message (e.g., seq=30, ack=10, window=400) is then also sent from the monitor application 603 to the network client 601 as indicated by arrow 622. A client key exchange (Client Key Ex) message (e.g., seq=10, ack=40, window=400) is sent from the network client 601 to the monitor application 603 as indicated by arrow 624. A cipher change specification (Change Cipher Spec) message (e.g., seq=20, ack=40, window=400) is also sent from the network client 601 to the monitor application 603 as indicated by arrow 626. A client finished (Client Finished) message (e.g., seq=30, ack=40, window=400) is then sent from the network client 601 to the monitor application 603 as indicated by arrow 628. A cipher change specification (Change Cipher Spec) message (e.g., seq=40, ack=40, window=400) is then sent from the monitor application 603 to the network client 601 as indicated by arrow 630. A server finished (Finished) message (e.g., seq=50, ack=40, window=400) is then sent from the monitor application 603 to the network client 601 the as indicated by arrow 632. As indicated by block 634, the handshake is complete at this point and the TLS link is active.

Once the two handshakes are done as indicated by blocks 634 and 654, the network client 601 sends its message as cipher text protected by the exchanged keys as indicated by arrow 656. The monitor application 603 decrypts this message using the keys exchanged between the network client 601 and the monitor application 603. This allows the monitor application 603 to monitor the contents of the message. The monitor application 603 then re-encrypts the message using the keys exchanged between the monitor application 603 and the network server 605. The monitor application 603 then sends the message as cipher text protected by these exchanged keys as indicated by arrow 658. As indicated by arrow 662, the network server 605 processes the message and sends back a return message as cipher text protected by the keys exchanged between the monitor application 603 and the network server 605. The monitor application 603 decrypts this message using the exchanged keys. This allows the monitor application 603 to monitor the contents of the return message. The monitor application 603 then re-encrypts the message using the keys exchanged between the monitor application 603 and the network client 601. The monitor application 603 then sends the message as cipher text protected by these exchanged keys as indicated by arrow 664. Because the monitor application 603 acts as a man-in-the-middle to decrypt and re-encrypt the messages, the network client 601 and the network server 605 are not aware of the monitoring activities of the monitor application 603.

In operation for the embodiment of FIGS. 5 and 6A, therefore, the agent instance 120 or monitor application 603 allows a requesting network source 142 or network client 601 to initially establish a session with the monitored application instance 108 or network server 605. Subsequently, in response to one or more monitored events, the agent instance 120 or monitor application 603 transparently inserts itself as the man-in-the-middle and creates two connections from the original single connection. Further, as shown in FIG. 5, the agent instance 120 can also migrate the session to an emulated or proxied instance 142 of the original application instance 108. In one embodiment, this may be accomplished by collecting and communicating session-related state information (e.g., TCP connection state info) between the original application instance and the proxied application instance. For secure transactions as shown in FIG. 6B, the monitor application 603 creates two secure connections, one with the network client 601 and one with the network server 605. This allows the monitor application 603 to continue to monitor contents of secure packets after a secure link has been established. Other variations could also be implemented while still taking advantage of the in-session connection splitting described herein.

FIG. 7 is a block diagram of an example embodiment for a virtual platform host server 700 that can be used to host VM platforms 102, 104 . . . 106. For the example embodiment depicted, the host server 700 includes one or processors 702 or other programmable integrated circuits to provide a virtualization layer 711 including a plurality of virtual machine (VM) platforms 712, 714, . . . 716 that run one or more applications as described herein with respect to VM platforms 102, 104 . . . 106. The host server 700 also includes one or more network interface cards (NICs) 704, one or more input/output (I/O) ports 706, one or more data storage systems 708, and memory 703 coupled to communicate with each other through a system bus interconnect 710. In operation, virtualization layer 711 and the VM platforms (VM1, VM2 . . . VM(N)) 712, 714, . . . 716 run on top of a host operating system (OS) 705. For example, the host operating system 705, the virtualization layer 711, and the VM platforms 712, 714, . . . 716 can be initialized, controlled, and operated by the processors or programmable integrated circuits 702 which load and execute software code and/or programming instructions stored in the data storage systems 708 to perform the functions described herein. Application instances and agent instances can run within the VM platforms 712, 714, . . . 716 as described above with respect to VM platforms 102, 104 . . . 106.

The memory 703 can include one or more memory devices that store program instructions and/or data used for operation of the VM host server 700. For example, during operation, one or more of the processor(s) 702 can load software or program instructions stored in the data storage systems 708 into the memory 703 and then execute the software or program instructions to perform the operations and functions described herein. In addition, for operation, one or more of the processors 702 or other programmable integrated circuit(s) can also be programmed with code or logic instructions stored in the data storage systems 708 to perform the operations and functions described herein. It is noted that the data storage system(s) 708 and the memory 703 can be implemented using one or more non-transitory tangible computer-readable mediums, such as for example, data storage devices, FLASH memory devices, random access memory (RAM) devices, read only memory (ROM) devices, other programmable memory devices, reprogrammable storage devices, hard drives, floppy disks, DVDs, CD-ROMs, and/or other non-transitory data storage mediums. It is further noted that the programmable integrated circuits can include one or more processors (e.g., central processing units (CPUs), controllers, microcontrollers, microprocessors, hardware accelerators, ASICs (application specific integrated circuit), and/or other integrated processing devices) and/or one or more programmable logic devices (e.g., CPLDs (complex programmable logic devices), FPGAs (field programmable gate arrays), PLAs (programmable logic array), reconfigurable logic circuits, and/or other integrated logic devices). Other variations and processing or computing platforms can also be implemented while still taking advantage of the firewall control techniques and proxied session techniques described herein.

The virtualization layer 711 described herein can be implemented using any desired virtualization layer, such as using a hypervisor or a container engine, that provides a virtual processing environment for the virtual platforms. Using a hypervisor, as shown in FIG. 8A below, the agent application 120 operates in addition to an application 802/812 on a guest operating system within one of the VM platforms 712/714 which in turn run on top of the hypervisor as the virtualization layer 711. Using a container engine, as shown in FIG. 8B below, the agent application 120 operates along with applications 802/812 within a VM platform 712 that operates on top of the container engine. As depicted in FIG. 8B, the VM platform 712 for this embodiment operates as a virtual computing platform without the emulated hardware (HW) 808 and without the guest operating system (OS) 806 that are shown with respect to the embodiment of FIG. 8A. In this container engine embodiment, the applications 802/812 as well as the agent application 120 are containers or other software components within a single virtual platform 712. This container engine embodiment of FIG. 9B thereby provides a more streamlined technique for adding the agent application 120 to a virtual platform as the containers are relatively isolated from each other. For one embodiment, the container engine can be implemented as a DOCKER container for a Linux operating system configured to execute DOCKER containers, which are software components that are designed to be compatible with a Linux-based DOCKER container engine. Other variations could also be implemented.

FIG. 8A is a block diagram of an example embodiment 800 for a host server that uses a hypervisor to provide a virtualization layer 711. For the embodiment 800, VM platforms 712 and 714 operate on top of hypervisor 711 which in turn operates on top of host operating system (OS) 705 which in turn operates on top of server hardware 820. For this embodiment 800, the host server provides emulated hardware (HW) resources 808 and a guest operating system (OS) 806 for VM platform 712, and VM platform 712 executes binary code (BINS) or libraries (LIBS) 804 on top of the guest operating system 806 to provide a first application (APP A) 802. Similarly, the host server provides emulated hardware (HW) resources 818 and a guest operating system (OS) 816 for VM platform 714, and VM platform 714 executes binary code (BINS) or libraries (LIBS) 814 on top of guest operating system 816 to provide a second application (APP B) 812. Thus, each of the VM platforms 712 and 714 has separate emulated hardware resources 808/818 and guest operating systems 806/816. For embodiment 800 as indicated above, an agent application 120 when installed can operate within one of the VM platforms 712/714 on top of the guest OS 806/816 along with one of the application 802/812.

FIG. 8B is a block diagram of an example embodiment 850 for a host server that uses a container engine to provide a virtualization layer 711. For the embodiment 850, VM platform 712 operates on top of container engine 711 which in turn operates on top of host operating system (OS) 705 which in turn operates on top of server hardware 820. For this embodiment 850, however, the VM platform 712 executes binary code (BINS) or libraries (LIBS) 804 directly on top of the container engine 711 to provide a first application (APP A) 802 and executes binary code (BINS) or libraries (LIBS) 814 directly on top of the container engine 711 to provide a second application (APP B) 812. As such, the container engine 711 provides a direct interface to the host operating system 705 without need for emulated hardware (HW) resources 808/818 and/or guest operating systems 806/816 as used in FIG. 8A. For embodiment 850 as indicated above, an agent application 120 when installed can operate along with the other applications 802/812 on top of the container engine 711 within the VM platform 712.

Figure 9:
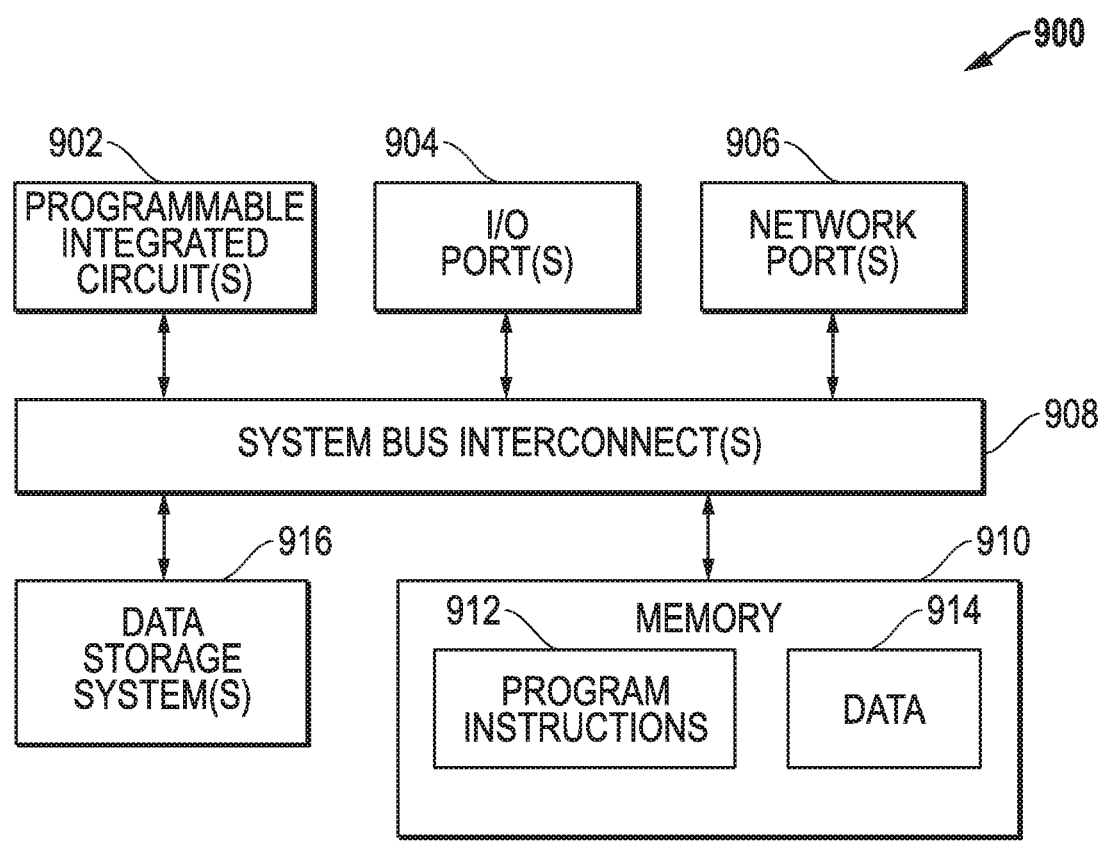
FIG. 9 is a block diagram of an example embodiment for a processing platform for a monitor application configured to split a traffic session into two proxied connections.

FIG. 9 is a block diagram of an example embodiment for a computing platform 900 that can be used as a processing system to implement the monitor application 603 and/or to implement a network source 412, an agent controller 130, a network client 601, and/or a network server 605. The computing platform 900 includes one or more processors or programmable integrated circuits 902, one or more input/output (I/O) ports 904, one or more network ports 906, one or more data storage systems 916, and memory 910 coupled to communicate with each other through a system bus interconnect 908. The memory 910 can include one or more memory devices that store program instructions 912 and/or data 914 that are used for operation of the computing platform 900. For example, during operation, one or more of the processors or programmable integrated circuit(s) 902 can load software or program instructions stored in the data storage systems 916 into the memory 910 and then execute the software or program instructions to perform the operations and functions described herein. In addition, for operation, one or more of the processors or programmable integrated circuit(s) 902 can also be programmed with code or logic instructions stored in the data storage systems 916 to perform the operations and functions described herein. It is noted that the data storage system(s) 916 and the memory 910 can be implemented using one or more non-transitory tangible computer-readable mediums, such as for example, data storage devices, FLASH memory devices, random access memory (RAM) devices, read only memory (ROM) devices, other programmable memory devices, reprogrammable storage devices, hard drives, floppy disks, DVDs, CD-ROMs, and/or other non-transitory data storage mediums. It is further noted that the programmable integrated circuit(s) 902 can include one or more processors (e.g., central processing units (CPUs), controllers, microcontrollers, microprocessors, hardware accelerators, ASICs (application specific integrated circuit), and/or other integrated processing devices) and/or one or more programmable logic devices (e.g., CPLDs (complex programmable logic devices), FPGAs (field programmable gate arrays), PLAs (programmable logic array), reconfigurable logic circuits, and/or other integrated logic devices). Other variations and processing or computing platforms can also be implemented while still taking advantage of the pre-processing and network tap control techniques described herein.

It is further noted that the functional blocks, components, systems, devices, and/or circuitry described herein can be implemented using hardware, software, or a combination of hardware and software. For example, the disclosed embodiments can be implemented using one or more programmable integrated circuits that are programmed to perform the functions, tasks, methods, actions, and/or other operational features described herein for the disclosed embodiments. The one or more programmable integrated circuits can include, for example, one or more processors and/or PLDs (programmable logic devices). The one or more processors can be, for example, one or more central processing units (CPUs), controllers, microcontrollers, microprocessors, hardware accelerators, ASICs (application specific integrated circuit), and/or other integrated processing devices. The one or more PLDs can be, for example, one or more CPLDs (complex programmable logic devices), FPGAs (field programmable gate arrays), PLAs (programmable logic array), reconfigurable logic circuits, and/or other integrated logic devices. Further, the programmable integrated circuits, including the one or more processors, can be configured to execute software, firmware, code, and/or other program instructions that are embodied in one or more non-transitory tangible computer-readable mediums to perform the functions, tasks, methods, actions, and/or other operational features described herein for the disclosed embodiments. The programmable integrated circuits, including the one or more PLDs, can also be programmed using logic code, logic definitions, hardware description languages, configuration files, and/or other logic instructions that are embodied in one or more non-transitory tangible computer-readable mediums to perform the functions, tasks, methods, actions, and/or other operational features described herein for the disclosed embodiments. In addition, the one or more non-transitory tangible computer-readable mediums can include, for example, one or more data storage devices, memory devices, flash memories, random access memories, read only memories, programmable memory devices, reprogrammable storage devices, hard drives, floppy disks, DVDs, CD-ROMs, and/or any other non-transitory tangible computer-readable mediums. Other variations can also be implemented while still taking advantage of the firewall control techniques and proxied session techniques described herein.

Further modifications and alternative embodiments of the described systems and methods will be apparent to those skilled in the art in view of this description. It will be recognized, therefore, that the described systems and methods are not limited by these example arrangements. It is to be understood that the forms of the systems and methods herein shown and described are to be taken as example embodiments. Various changes may be made in the implementations. Thus, although the inventions are described herein with reference to specific embodiments, various modifications and changes can be made without departing from the scope of the present inventions. Accordingly, the specification and figures are to be regarded in an illustrative rather than a restrictive sense, and such modifications are intended to be included within the scope of the present inventions. Further, any benefits, advantages, or solutions to problems that are described herein with regard to specific embodiments are not intended to be construed as a critical, required, or essential feature or element of any or all the claims.

What is claimed is:

1. A method to protect a network, comprising:
   monitoring packet traffic for an application instance;
   forming a traffic session between the application instance and a network client based upon a connection request from the network client;
   monitoring, by an agent instance located in-line between the network client and the application instance, the traffic session to detect one or more events;
   detecting, by the agent instance, the one or more events during the traffic session based upon the monitoring, wherein detecting the one or more events includes receiving, by the agent instance and during the traffic session, a request from the network client to the application instance to establish a secure communications link between the network client and the application instance;

only after receiving the request to establish the secure communications session between the network client and the application instance, creating a proxied application instance that is separate from the application instance, and initiating a proxied session between the proxied application instance and the network client such that no proxy for the traffic session is initiated before the detecting; and communicating with the network client using the proxied session, wherein communicating with the network client using the proxied session includes operating, by the agent instance, as a transparent proxy and a man-in-the-middle device by receiving packets from the network client, modifying or encapsulating the packets to include a destination address of the proxied application instance, forwarding the packets to the proxied application instance, receiving return packets from the proxied application instance, modifying or unencapsulating the return packets so that the return packets appear to be from the application instance, and forwarding the return packets to the network client.

2. The method of claim 1, wherein the application instance provides one or more network services to the network client.

3. The method of claim 1, wherein the initiating the proxied session comprises splitting the traffic session into a first connection including the network client and a second connection including the proxied application instance.

4. The method of claim 3, further comprising forwarding contents of packets for the proxied session to a controller and analyzing contents of packets within the proxied session to identify one or more network threats.

5. The method of claim 4, wherein the contents of the packets comprise contents of decrypted packets.

6. The method of claim 3, further comprising analyzing contents of packets within the proxied session to identify one or more network threats.

7. The method of claim 6, further comprising taking one or more actions with respect to the application instance based upon identification of the one or more network threats.

8. The method of claim 1, wherein the proxied session is transparent to the network client such that the network client is not aware of the proxied session.

9. The method of claim 8, further comprising, based upon detecting the request for a secure communication link, forming a first secure connection including the network client and forming a second secure connection including the proxied application instance.

10. The method of claim 9, further comprising exchanging a first set of security keys with the network client to form the first secure connection and exchanging a second set of security keys with the proxied application instance to form the second secure connection.

11. The method of claim 10, further comprising decrypting and re-encrypting packets within the first secure connection using the first set of security keys, and decrypting and re-encrypting packets within the second secure connection using the second set of security keys.

12. The method of claim 11, further comprising analyzing contents of decrypted packets and taking one or more actions based upon the analyzing.

13. A system to protect a network, comprising:
an application instance configured to receive packet traffic; and
one or more programmable integrated circuits, including at least one of a processor or a configurable logic device, programmed to:
implement an agent instance located in-line between the network client and the application instance to monitor the packet traffic for the application instance including a traffic session formed between a network client and the application instance based upon a connection request from the network client;
detect, using the agent instance, one or more events associated with the traffic session being monitored during the traffic session, wherein detecting the one or more events includes receiving, by the agent instance and during the traffic session, a request from the network client to the application instance to establish a secure communications link between the network client and the application instance;
only after receiving the request to establish the secure communications link between the network client and the application instance, creating a proxied application instance that is separate from the application instance, and initiate a proxied session between the network client and the proxied application instance such that no proxy for the traffic session is initiated before the detection; and
communicate with the network client using the proxied session, wherein communicating with the network client using the proxied session includes operating, by the agent instance, as a transparent proxy and a man-in-the-middle device by receiving packets from the network client, modifying or encapsulating the packets to include a destination address of the proxied application instance, forwarding the packets to the proxied application instance, receiving return packets from the proxied application instance, modifying or unencapsulating the return packets so that the return packets appear to be from the application instance, and forwarding the return packets to the network client.

14. The system of claim 13, wherein the application instance is configured to provide one or more network services to the network client.

15. The system of claim 13, wherein the one or more programmable integrated circuits are further programmed to initiate the proxied session by splitting the traffic session into a first connection including the network client and a second connection including the proxied application instance.

16. The system of claim 15, wherein the one or more programmable integrated circuits are further programmed to forward contents of packets for the proxied session to a controller for analysis to identify one or more network threats.

17. The system of claim 16, wherein the contents of the packets comprise contents of decrypted packets.

18. The system of claim 15, wherein the one or more programmable integrated circuits are further programmed to analyze contents of packets within the proxied session to identify one or more network threats.

19. The system of claim 18, wherein the one or more programmable integrated circuits are further programmed to take one or more actions with respect to the application instance based upon identification of the one or more network threats.

20. The system of claim 13, wherein the proxied session is transparent to the network client such that the network client is not aware of the proxied session.

21. The system of claim 20, wherein the one or more programmable integrated circuits are further programmed to, based upon detection of the request for a secure communication link, form a first secure connection including the network client and form a second secure connection including the proxied application instance.

22. The system of claim 21, wherein the one or more programmable integrated circuits are further programmed to exchange a first set of security keys with the network client to form the first secure connection and exchange a second set of security keys with the proxied application instance to form the second secure connection.

23. The system of claim 22, wherein the one or more programmable integrated circuits are further programmed to decrypt and re-encrypt packets within the first secure connection using the first set of security keys, and decrypt and re-encrypt packets within the second secure connection using the second set of security keys.

24. The system of claim 23, wherein the one or more programmable integrated circuits are further programmed to analyze contents of decrypted packets and take one or more actions based upon the analyzing.

\* \* \* \* \*